United States Patent [19]

Renz et al.

[11] 4,123,111
[45] Oct. 31, 1978

[54] SNAP-IN CONNECTION, ESPECIALLY COVER FOR WHEELS OF PASSENGER MOTOR VEHICLES

[75] Inventors: Udo D. Renz, Rechberghausen; Dieter Memmhardt, Stuttgart, both of Germany

[73] Assignee: Daimler-Benz Aktiengesellschaft, Germany

[21] Appl. No.: 725,725

[22] Filed: Sep. 23, 1976

[30] Foreign Application Priority Data

Sep. 26, 1975 [DE] Fed. Rep. of Germany ....... 2542973

[51] Int. Cl.² .............................................. B60B 7/06
[52] U.S. Cl. .............................. 301/37 TP; 301/37 S; 301/108 S
[58] Field of Search ............. 301/37 R, 37 P, 37 CM, 301/37 TP, 37 PB, 37 S, 37 B, 108 R, 108 A, 108 S, 9 DN

[56] References Cited

U.S. PATENT DOCUMENTS

| 2,217,086 | 10/1940 | Whitacre | 301/37 R |
|---|---|---|---|
| 2,860,922 | 11/1958 | Lyon, Jr. | 301/37 PB |
| 2,911,261 | 11/1959 | Lyon | 301/37 SA |
| 3,869,175 | 3/1975 | Spisak | 301/37 CM X |
| 3,883,181 | 5/1975 | Dissinger | 301/37 P |

FOREIGN PATENT DOCUMENTS

| 919,394 | 10/1954 | Fed. Rep. of Germany | 301/37 TP |
|---|---|---|---|
| 894,790 | 4/1962 | United Kingdom | 301/37 PB |

*Primary Examiner*—Robert B. Reeves
*Assistant Examiner*—Charles A. Marmor
*Attorney, Agent, or Firm*—Craig & Antonelli

[57] ABSTRACT

A snap-in connection, especially a hub cap for wheels of passenger motor vehicles which is adapted to be fastened by the use of a force fit, which covers at least the wheel center, which is elastically deformable and which includes an edge that engages in the installed position under a collar of the wheel fastening bolt heads; the hub cap is thereby provided with material for a detent-engagement in the force-engaging plane of the detents but has a shape differing from the circular shape, whereby a relatively large lever arm is formed between the connecting lines of the points of engagement of the detent-points and the periphery which reduces the spring rate.

5 Claims, 6 Drawing Figures

SNAP-IN CONNECTION, ESPECIALLY COVER FOR WHEELS OF PASSENGER MOTOR VEHICLES

The present invention relates to a snap-in connection, especially to a cover cap for wheels of passenger motor vehicles, commonly also referred to as hub cap which is secured by means of a force fit, which covers at least the wheel center, which is elastically deformable and includes a rim that in the installed position engages from the inside toward the outside underneath detents, preferably under collars of the wheel-fastening bolt heads.

In most automobiles, the wheel hubs together with the wheel-fastening bolts are covered off by synthetic plastic or metal caps. This covering takes place, on the one hand for aesthetic reasons and, on the other, in order to render non-dangerous projecting bolts and other parts of the rotating wheel for objects moving past the wheel and to catch loose bolts which, by their movement and their abutment in the cap interior call the attention of the driver to this fastening defect.

Essentially two variations exist for the fastening of the wheel or hub caps. In one case, the caps have the form of an endless cylindrical or conical pot and include an edge extending circumferentially at the rim which snaps-in under the collar of the wheel fastening bolts. Such caps have a very high spring rate because the necessary tolerances are relatively large so that a uniformly fast seating is not attainable with a large number of series-manufactured caps.

With other wheels or hub caps the cylinders are cut-in several times parallel to the center axis so that individual lugs or tabs result which are stressed more or less purely in bending and can be very soft in bending. The disadvantage of this construction resides in the fact that the slots are not esteemed aesthetically and that the manufacturing expenditure is too large if the cap is to form at the same time a protective covering for bolts and the like, which is to be closed-off if possible.

Other wheel or hub caps are provided with fastening springs which must snap in under a rim horn. These springs which are inserted at a turned-over fold at the edge of the cap, can be easily lost and make the assembly of the cap considerably more difficult with an incorrect use thereof. As a result thereof, also an incorrect installation is possible which only appears to be correct so that the cap is lost already after a short period of time.

It is the aim of the present invention to avoid these disadvantages and to provide a cap which, by reason of its special shape, has a spring rate lying within reasonable limits, can be snapped in safely and easily and does not permit a damage of the wheel cap at ever new places.

The underlying problems are solved according to the present invention in that the cover or hub cap is provided circumferentially in the engaging plane of the detents with material from which the cap is made, and has a shape differing from the circular shape and as a result thereof exhibits a relatively large lever arm between the connecting lines of the points of engagement of the detent points, for example, of the wheel-fastening bolts and of the periphery, which reduces the spring rate. According to a further feature of the present invention, the points of engagement of the wheel-fastening bolts may be located in recesses of the cover cap and the number of the recesses may correspond to the number of the fastening bolts. As a result thereof, the strains of wear which occur in snap-in connections between the participating elements are effective in the cap always at the same places so that also eventual damages at the cap occur always at the same places which are not visible in the assembled condition, and therewith the visible parts of the cap cannot be damaged by reason of the snap-in connection.

In order that also the fastening bolts can additionally be covered off and can be protected at least approximately against entering dirt or water, the cover cap may advantageously include also a protective cap. The protective cap can thereby be made in one piece with the cover cap or can be mounted over the cover cap.

Accordingly, it is an object of the present invention to provide a snap-in connection, especially to covering caps for wheels of passenger motor vehicles, which avoids by simple means the aforementioned shortcomings and drawbacks encountered in the prior art.

Another object of the present invention resides in hub caps which assure a uniform secure seating notwithstanding their manufacture by mass production techniques.

A further object of the present invention resides in a wheel or hub cap which is pleasing from an aesthetic point of view, involves relatively low manufacturing costs and at the same time can be readily installed without the danger of being lost.

A still further object of the present invention resides in a hub cap for wheels of passenger motor vehicles which precludes an incorrect installation, thereby eliminating the danger of loss thereof.

Another object of the present invention resides in a hub cap for wheels of passenger motor vehicles in which any eventual damages at the cap will always appear at the same places which are not visible in the assembled condition, thereby protecting the appearance of the visible parts of the hub cap.

These and other objects, features and advantages of the present invention will become more apparent from the following description when taken in connection with the accompanying drawing which shows, for purposes of illustration only, one embodiment in accordance with the present invention, and wherein.

Figure 1A:
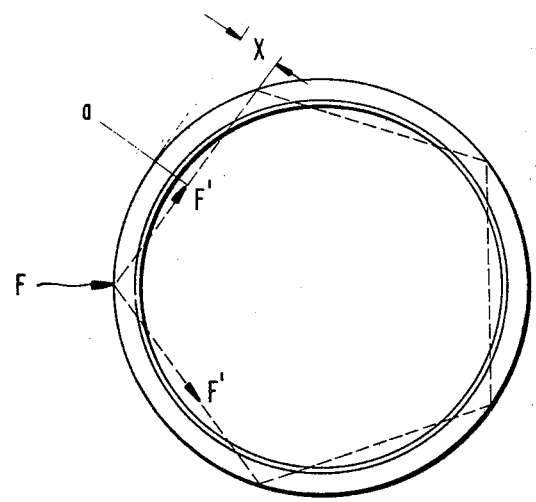
FIG. 1a is a plan view on a prior art circular conical cap with a pentagon, whereby the "spring rate" is explained by the straight lines thereof.
Figure 1B:
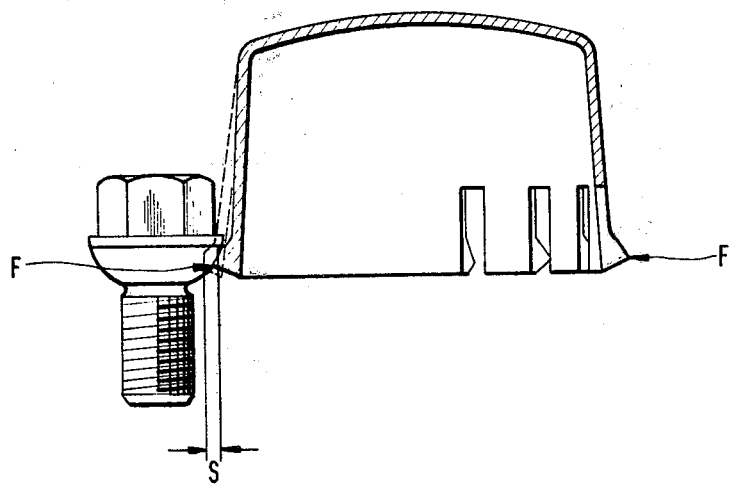
FIG. 1b is a cross-sectional view on the left side through the cap of FIG. 1a and on the right side through a similar prior art cap which is provided with notches extending parallel to the center axis.
Figure 4:
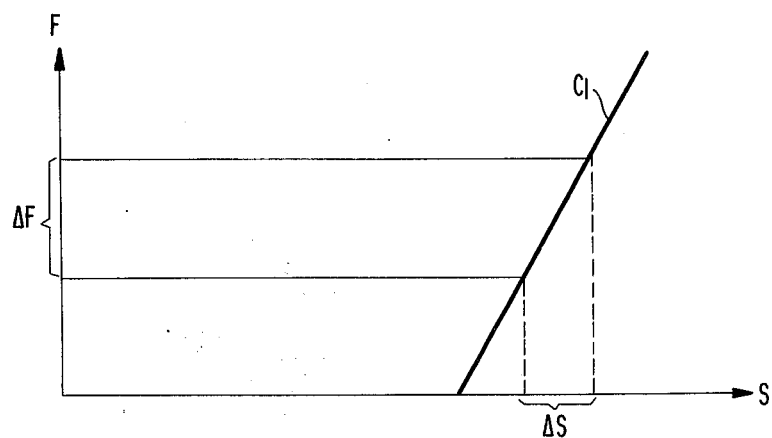
FIGS. 4 and 5 are diagrams illustrating different large spring forces as a function of different spring rates.
Figure 5:
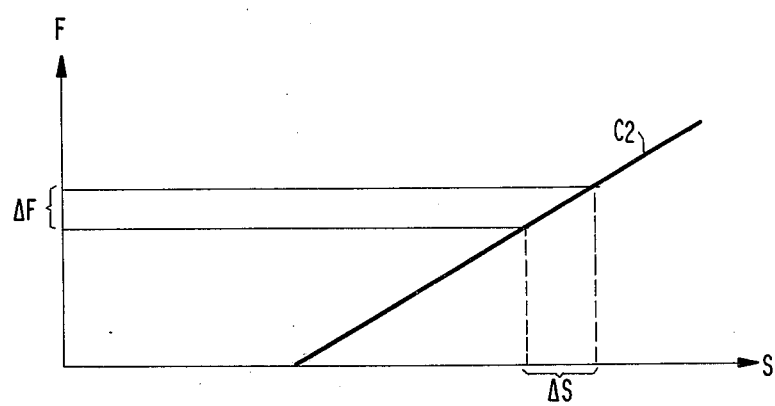

Referring now to the drawing wherein like reference numerals are used throughout the various views, and more particularly to FIGS. 1a and 1b, a cover or hub cap is illustrated in these figures together with a fastening bolt. FIG. 1b (left portion) illustrates the cap in dash line in the non-installed, i.e., unstressed condition and in full lines in the installed, i.e., stressed condition of the cap edge. A spring path S results between the cap edge illustrated in dash lines and the cap edge illustrated in full lines. In FIGS. 1a and 1b, the spring force is designated by reference character F which is exerted by the fastening bolt onto the cap. If the cover walls extended as a straight line between the wheel bolts corresponding to the line $a$ (FIG. 1a), then the force F acting on the cap would be subdivided into two components F' which act as compression forces in the cap and would produce as spring element a very high spring rate $C_1$ (FIG. 4) corresponding to the modulus of elasticity of the material of the cap. A satisfactory installation of such a pentagonal cap would hardly be posible with this high spring rate. In the embodiment illustrated in FIGS. 1a and 1b, the cap becomes somewhat softer by the circular shape thereof since in that case the cap is additionally stressed in bending by the lever arm X between the line $a$ and the edge of the cap. This possibility of the bending stress, however, is too small in many cases in order to bring about a properly seated snap-in connection notwithstanding the occurring tolerances in the connection wheel, wheel bolts and cap. This is so as a snap-in connection with a lower spring rate $C_2$ (FIG. 5) is necessary therefor. The diagrams in FIGS. 4 and 5 serve to explain this interrelationship. FIG. 4 illustrates a diagram with a high spring rate $C_1$, i.e., with a small lever arm X. FIG. 5 illustrates a diagram with low spring rate $C_2$, i.e., with a larger lever arm $X_E$. In these diagrams, the spring force F is plotted along the ordinate and the spring path is plotted along the abscissa. It follows therefrom that with the same $\Delta S$, which produces the differing compression of the cap as a result of tolerances at wheel, cap and bolts, a larger play for the spring force $\Delta F$ results with the higher spring rate $C_1$. This means that the lever arm $X_E$ (FIG. 2) must be made as large as possible in order to attain a small $\Delta F$ (FIG. 5).

Figure 2:
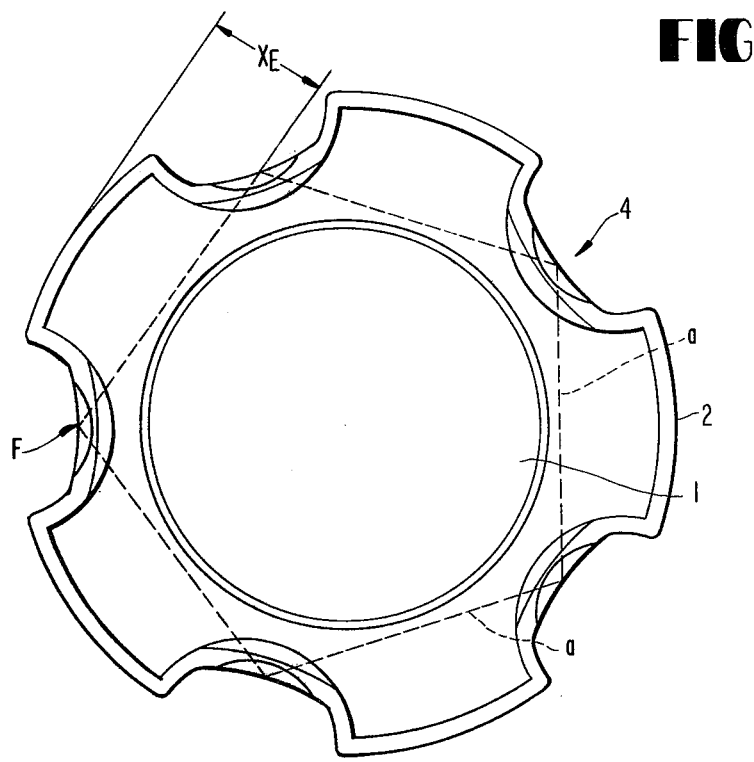
FIG. 2 is a plan view on a cap in accordance with the present invention.
Figure 3:
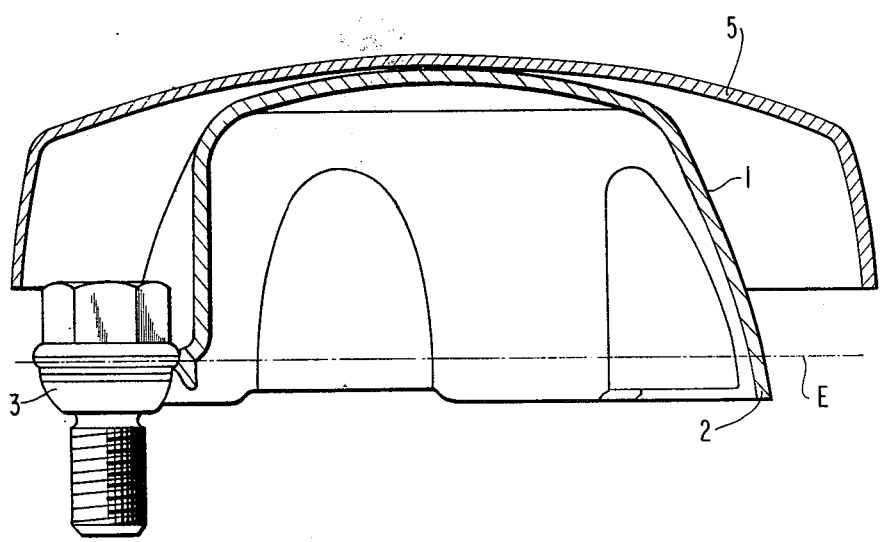
FIG. 3 is a transverse cross-sectional view through the cap of FIG. 2 which is additionally also provided with a separate protective cap.

For that reason, the cover or hub cap 1 according to the present invention, as illustrated in FIGS. 2 and 3 is so constructed that a large lever arm $X_E$ results between its periphery 2 and the connecting lines $a$ between the points of engagement F of the fastening bolts 3. For that purpose, the edge 2 is provided with recesses 4 in which are seated the heads of the fastening bolts 3, at which the edge of the cover cap snaps-in within the area of the recesses 4. FIG. 2 also illustrates that cap material exists circumferentially in the engaging plane E (FIG. 3) of the fastening bolts 3, i.e., a cut-out does not exist precisely thereat in this plane. For the protection of the bolts 3, the cover cap is additionally provided with a protective cap 5. However, the cover cap 1 and the protective cap 5 may also be constructed as a one-piece, common part.

The type and size of the recesses 4 can be chosen at will so that a desired large lever arm X results whereby the cap as snap-in element can be constructed as soft as desired by the magnitude of the lever arm. Such a construction of the cover or hub cap enables in every case a good, permanent snap-in connection far-reachingly independent with respect to tolerances. As to the rest, one obtains thereby a cap which always engages at the same places behind the bolts so that the remaining visible parts thereof are not damaged by scratches resulting during the installation of the cap.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims. We claim:

1. A snap-in cover cap adapted to be fastened by a force fit to a plurality of cap-retaining detents, said cover cap being formed of elastically deformable material and having an uninterrupted peripheral edge with first portions of a first configuration, said peripheral edge being further provided with a plurality of detent engaging recesses therein of a second configuration, said recesses forming slots which open axially and radially outwardly for receiving said detents and being alternately arranged with said first portions about said peripheral edge and having edge portions of a shape engageable from the inside toward the outside underneath said cap-retaining detents in an installed position and forming detent engaging points, said first configuration being dimensioned radially outwardly with respect to the engaging points of said second configuration a distance producing a lever arm between said first portions and connecting lines between adjacent detent engaging points which is sufficient for reducing the force required to achieve a predetermined compression of said cap at said engaging points while maintaining a satisfactory gripping force at said engaging points.

2. A cover cap according to claim 1, characterized in that the recesses and their edge portions have a concave configuration retainable by detents formed by collars of wheel-fastening bolt heads.

3. A cover cap according to claim 1, characterized in that the cap includes a protective cap.

4. A cover cap according to claim 3, characterized in that the protective cap is made in one-piece with the cover cap.

5. A cap according to claim 3, wherein said protective cap extends radially outwardly beyond said peripheral edge.

* * * * *